US007531141B2

(12) United States Patent
Descotes et al.

(10) Patent No.: US 7,531,141 B2
(45) Date of Patent: May 12, 2009

(54) MOBILE AIR DECONTAMINATION AND PURIFICATION UNIT

(75) Inventors: Laurent Descotes, Chatenay-Malabry (FR); Aymeric Perrier, Trevoux (FR); Vivien Darracq, La Verriere (FR); Vance Bergeron, Francheville (FR); Laurent Adrien Fullana, L'etang la ville (FR)

(73) Assignee: AirInSpace B.V., Delft (NL)

( * ) Notice: Subject to any disclaimer, the term of this patent is extended or adjusted under 35 U.S.C. 154(b) by 357 days.

(21) Appl. No.: 11/580,477

(22) Filed: Oct. 12, 2006

(65) Prior Publication Data

US 2008/0086994 A1      Apr. 17, 2008

(51) Int. Cl.
    *A62B 7/08*         (2006.01)
(52) U.S. Cl. .................. 422/121; 422/122; 422/177; 422/186.04; 96/15; 96/68; 96/233; 96/422; 55/356; 55/472; 55/480; 55/481; 55/485; 55/490; 55/493; 55/506
(58) Field of Classification Search ............. 96/15, 96/68, 223, 422; 55/471, 472, 480, 485, 55/490, 493, DIG. 39, 356, 481, 506; 422/4, 422/117, 186.04, 121, 122, 177
    See application file for complete search history.

(56) References Cited

U.S. PATENT DOCUMENTS

| | | | | | |
|---|---|---|---|---|---|
| 3,137,550 | A | * | 6/1964 | Fruth ............................. | 96/66 |
| 3,222,848 | A | * | 12/1965 | Koble, Jr. ...................... | 96/66 |
| 3,859,816 | A | * | 1/1975 | McDonald et al. ............ | 62/239 |
| 3,999,964 | A | * | 12/1976 | Carr ............................... | 96/59 |
| 4,133,652 | A | * | 1/1979 | Ishikawa et al. ............... | 96/58 |
| 4,261,712 | A | | 4/1981 | Kinkade | |
| 5,230,723 | A | * | 7/1993 | Travis et al. ................... | 96/57 |
| 5,474,600 | A | * | 12/1995 | Volodina et al. ............... | 96/57 |

(Continued)

FOREIGN PATENT DOCUMENTS

FR        2 859 522         3/2005

(Continued)

OTHER PUBLICATIONS

International Search Report dated Mar. 28, 2008 from corresponding International Application No. PCT/US2007/080851.

(Continued)

*Primary Examiner*—Duane Smith
*Assistant Examiner*—Sonji Turner
(74) *Attorney, Agent, or Firm*—Beyer Law Group LLP

(57) ABSTRACT

A variety of transportable air treatment system improvements are described. In one aspect of the invention, the system is designed to significantly reduce the noise generated during operation. In another aspect, an easily removable cooling unit is provided. In still another aspect, an air treatment unit (as for example a plasma reactor) is provided that is arranged to filter the air stream, inactivate biological organisms and/or reduce or eliminate volatile organic compounds (VOCs) that are carried in the air stream. The air treatment unit may take the form of a plurality of stacked trays. In yet another aspect of the invention, the air treatment system further includes a duct unit that directs air from the air treatment unit to the treated air outlet. The duct unit is operable to clamp the stacked trays to help seal the stacked trays.

25 Claims, 11 Drawing Sheets

U.S. PATENT DOCUMENTS

| | | | |
|---|---|---|---|
| 5,487,766 A * | 1/1996 | Vannier | 55/356 |
| 5,588,985 A * | 12/1996 | Shagott et al. | 95/25 |
| 5,593,470 A * | 1/1997 | Shagott et al. | 96/418 |
| 5,616,172 A | 4/1997 | Tuckerman et al. | |
| 5,641,331 A * | 6/1997 | Diachuk | 55/343 |
| 5,641,342 A * | 6/1997 | Smith et al. | 96/77 |
| 5,656,049 A * | 8/1997 | Diachuk | 55/350.1 |
| 6,036,736 A * | 3/2000 | Wallace et al. | 55/385.2 |
| 6,099,607 A * | 8/2000 | Haslebacher | 55/356 |
| 6,187,271 B1 * | 2/2001 | Lee et al. | 422/121 |
| 6,648,947 B2 * | 11/2003 | Paydar et al. | 95/278 |
| 6,793,897 B2 * | 9/2004 | Shannon | 422/186 |
| 7,112,232 B2 * | 9/2006 | Chang et al. | 55/481 |
| 7,270,698 B2 * | 9/2007 | Tanaka et al. | 96/95 |
| 7,332,020 B2 * | 2/2008 | Tanaka et al. | 96/66 |
| 7,377,962 B2 * | 5/2008 | Tanaka et al. | 96/83 |
| 7,384,456 B2 * | 6/2008 | Aubert | 96/77 |
| 7,481,869 B2 * | 1/2009 | Vanderhoof et al. | 96/4 |
| 2004/0047776 A1 | 3/2004 | Thomsen | |
| 2006/0162300 A1* | 7/2006 | Sharifi | 55/350.1 |
| 2006/0162564 A1 | 7/2006 | Paterson et al. | |
| 2007/0137480 A1* | 6/2007 | Bergeron et al. | 95/79 |
| 2007/0137486 A1* | 6/2007 | Bergeron et al. | 96/66 |
| 2007/0140932 A1* | 6/2007 | Bergeron et al. | 422/186.04 |
| 2007/0202798 A1 | 8/2007 | Billiotte et al. | |

FOREIGN PATENT DOCUMENTS

| | | |
|---|---|---|
| GB | 1 549 877 | 8/1979 |
| JP | 2002132497 | * 11/2003 |
| WO | 97/29830 | 8/1997 |
| WO | 00/04976 | 2/2000 |
| WO | WO 2005/025711 | 3/2005 |

OTHER PUBLICATIONS

Written Opinion dated Mar. 28, 2008 from corresponding International Application No. PCT/US2007/080851.
U.S. Appl. No. 11/408,737, filed Apr. 18, 2006.
U.S. Appl. No. 11/407,236, filed Apr. 18, 2006.
U.S. Appl. No. 11/406,941, filed Apr. 18, 2006.
U.S. Appl. No. 11/445,087, filed May 31, 2006.
U.S. Appl. No. 10/571,558, filed Dec. 7, 2006.

* cited by examiner

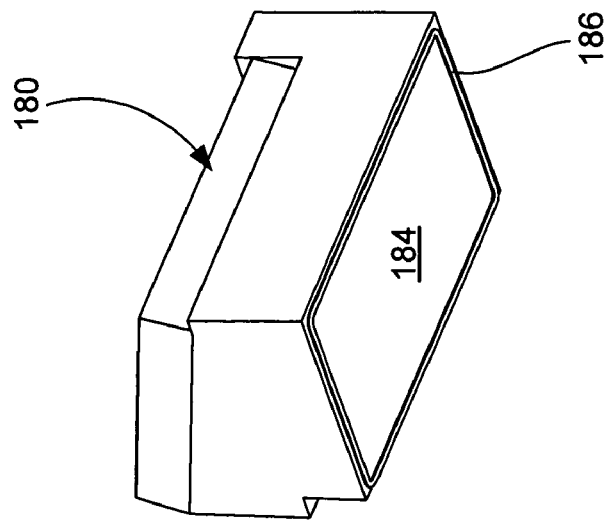
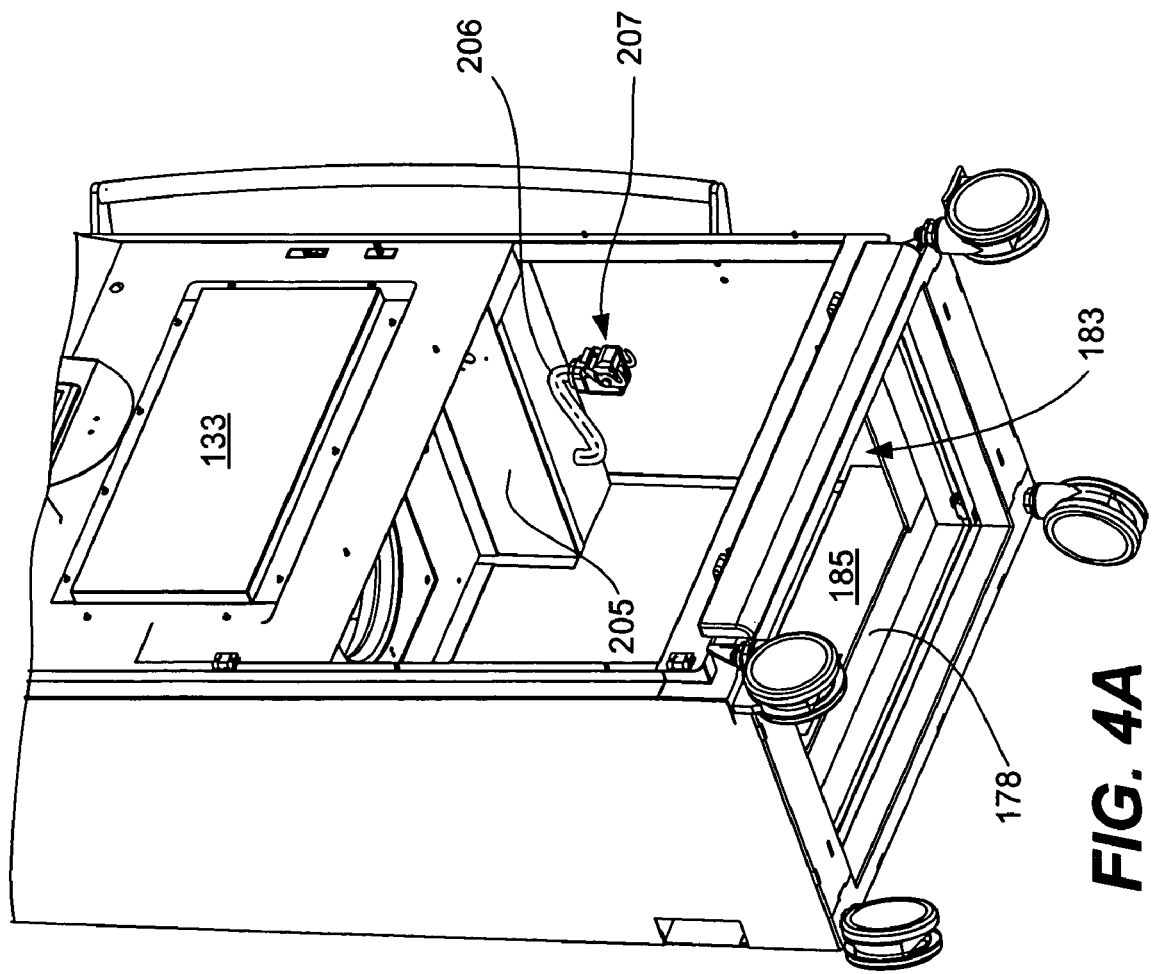

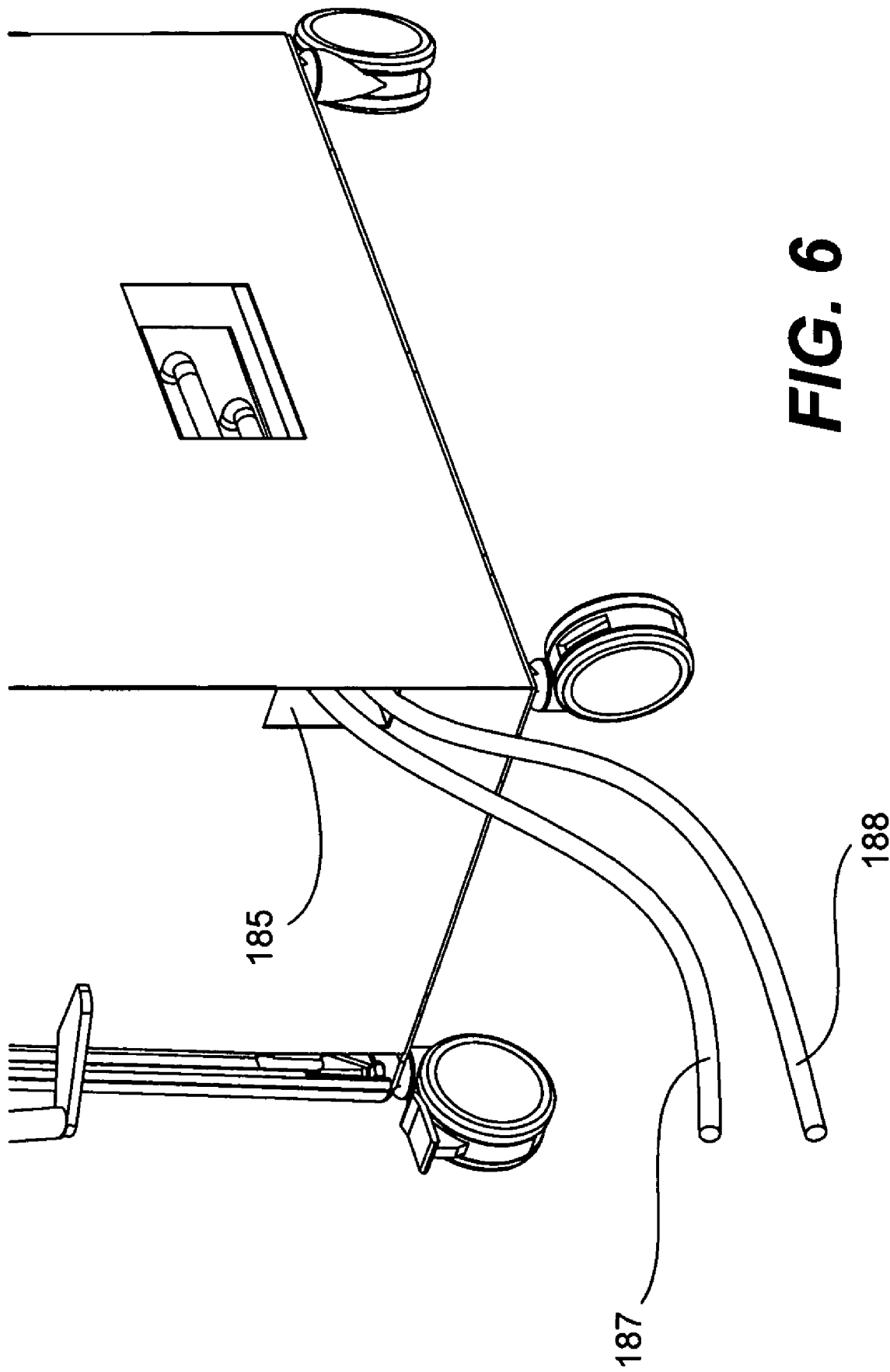

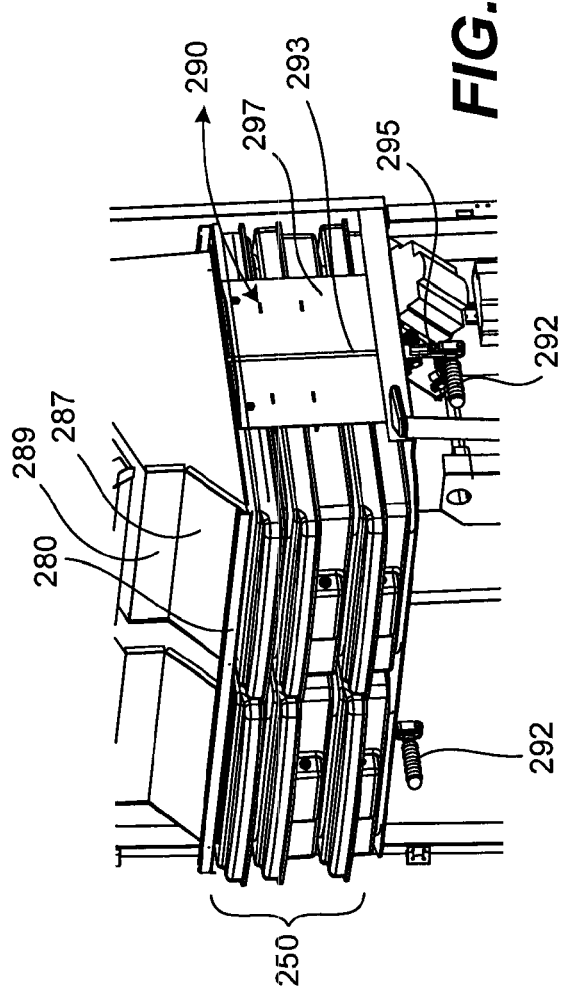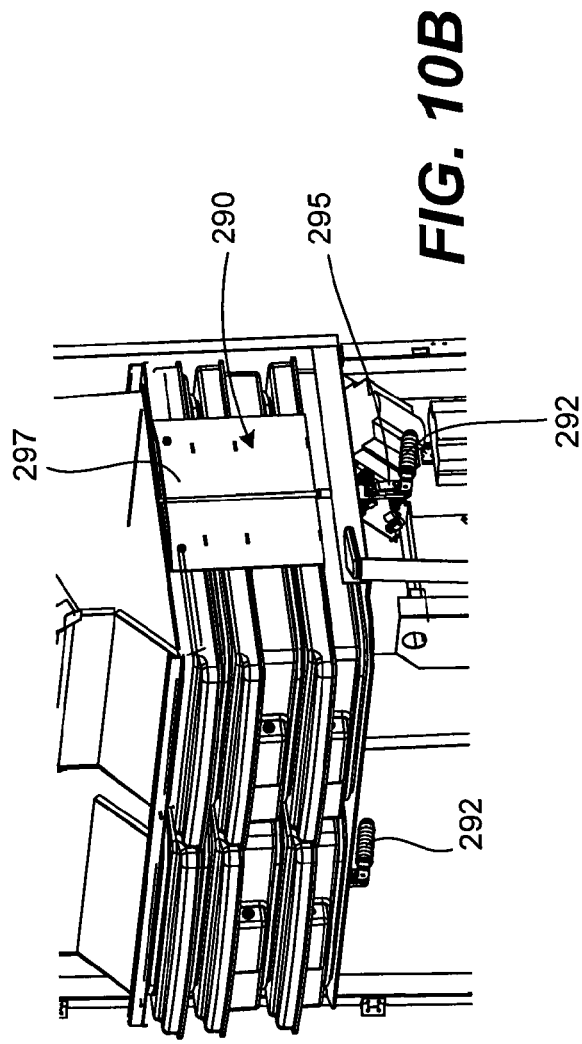

MOBILE AIR DECONTAMINATION AND PURIFICATION UNIT

BACKGROUND OF THE INVENTION

The present invention relates generally to mobile air decontamination and purification units.

There are currently a wide range of technologies that are used to decontaminate, purify and/or filter air. Within building structures (e.g., commercial buildings, hospitals, residential dwellings, etc.) the purification and filtering systems are sometimes built into a central heating, air conditioning and ventilation (HVAC) system. However, many buildings structures do not have central HVAC systems and often those with central HVAC systems include some level of filtering, but not much if any air purification or decontamination abilities. Therefore, there are a wide variety of applications where it is desirable to provide an air filtering, purification and/or decontamination unit that is suitable for treating the air in a room.

In some applications such as in infectious disease units of a hospital, it may be very desirable to provide room air treatment system that is arranged to inactivate (i.e. kill) airborne biological objects (e.g., microorganisms and viruses) in addition to filtering the air. It many applications, it is desirable to provide a room air handling unit that can effectively remove volatile organic compounds (VOCs) for health or comfort reasons. There are also a number of applications that require a high level of filtering (e.g., HEPA or ULPA filtering) for the room. Of course, there are a number of applications in which it is desirable to provide two or more of these features.

To effectively perform these types of air decontamination, purification and/or filtering tasks, it is often important that the air handling unit be arranged to handle a relatively high airflow rate. It is also preferable that the unit be designed to help insure an airflow pattern within the room that is conducive to effectively circulating the air within the room in a manner that helps increase the probability that: (1) all of the air within the room is treated on a regular basis; and (2) a desirable air flow pattern is established within the room. Very few existing air handling units address these needs, although there are some that do. One room air handling unit that is designed to address these issues is described in International Application No. PCT/FR04/02309, which corresponds to U.S. application Ser. No. 10/571,558 (both of which are incorporated herein by reference). Although the devices described therein work well and a variety of other air handling unit designs exist, there are continuing efforts to improve the design of room and space air handling devices to meet the needs of particular application. By way of example, one problem that is frequently encountered in large airflow rate air handling devices is that they can be relatively noisy and there are continuing efforts to reduce the noise generated by such devices. Another area of concern relates to the ease of maintenance and ease with which the air handling units can be cleaned.

SUMMARY OF THE INVENTION

A variety of improvements suitable for use in transportable air treatment systems are described. In one aspect of the invention, a transportable air treatment system includes a cabinet or housing having an air intake located near its bottom end and a treated air outlet located near its top end. A generally vertically extending airflow path extends between the inlet and outlet. A number of components are positioned within the airflow path. For example, in many embodiments, the first structure is a prefilter that is arranged to pre filter air drawn into the air treatment system. A first chamber is located downstream of the prefilter and a second chamber is located downstream of the first.

A fan support plate defines a boundary between the first and second chamber and a fan is mounted on the fan support plate. In a preferred embodiment, the fan is located substantially centrally relative to the side walls of the first and second chambers. The second chamber is also preferably balanced aerodynamically to help reduce the probability that air pressure differentials within the second chamber will induce noise generating imbalances within the fan. The walls of the second chamber also preferably include noise abatement materials, which further reduce the level of noise generated by the air treatment system. The size of the fan may be widely varied, but in many applications the fan is sized so that it is capable of conveying at least approximately 1000 cubic meters per hour of air through the air treatment system along the air flow path.

An air treatment unit is located downstream of the second compartment. The air treatment unit is arranged to further filter air conveyed along the airflow path. It may also be arranged to inactivate biological organisms and/or reduce or eliminate volatile organic compounds (VOCs) that are carried in the air stream. In some preferred embodiments, the air treatment unit may take the form of a plasma reactor.

In another aspect of the invention, a removable cooling unit is mounted in the first chamber. The cooling unit is arranged to pre-cool at least some of the air that passes through the air treatment unit. Preferably the cooling unit may be installed by simply placing the cooling unit in the first chamber and attaching inlet and outlet hoses using quick release connectors and connecting any required electrical cable(s).

In another aspect of the invention, the air treatment unit includes a plurality of stacked trays. In many embodiments, seals are provided between adjacent trays in the stack. Each tray has a box that holds components of the air treatment unit and a lid that covers the box. In one preferred embodiment, the stacked trays include a first tray having a plasma generator therein and a second tray located downstream of the first tray that includes an electrostatic filter. In another preferred embodiment, the stacked trays further include a third tray located downstream of the second tray that includes a catalyst. In other embodiments, more or less trays may be provided and a variety of air treatment components may be used in place of, or in addition to the described arrangements.

In yet another aspect of the invention, the air treatment system further includes a duct unit that directs air from the air treatment unit to the treated air outlet. The duct unit is operable to clamp the stacked trays to help seal the stacked trays.

In still another aspect of the invention, an electronic control box is positioned at least partially within the second chamber and a matching structure is positioned within the second chamber that substantially mirrors an external geometry of the electronic control box to help aerodynamically balance the second chamber as seen by the fan.

BRIEF DESCRIPTION OF THE DRAWINGS

The invention and the advantages thereof, may best be understood by reference to the following description taken in conjunction with the accompanying drawings in which:

FIG. 4(a) is a more detailed diagrammatic front perspective view of the first (cooling unit) chamber shown in FIG. 3.

FIG. 4(b) is a diagrammatic front perspective view of a cooling unit suitable for use in some embodiments of the invention.

FIG. 6 is a diagrammatic view of the back of the housing with the cooling unit installed.

FIGS. 10(a) and 10(b) are perspective partially cutaway views illustrating the components of a duct based clamping system in accordance with an embodiment of the invention, with views of the clamping system in the compression and release positions respectively.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
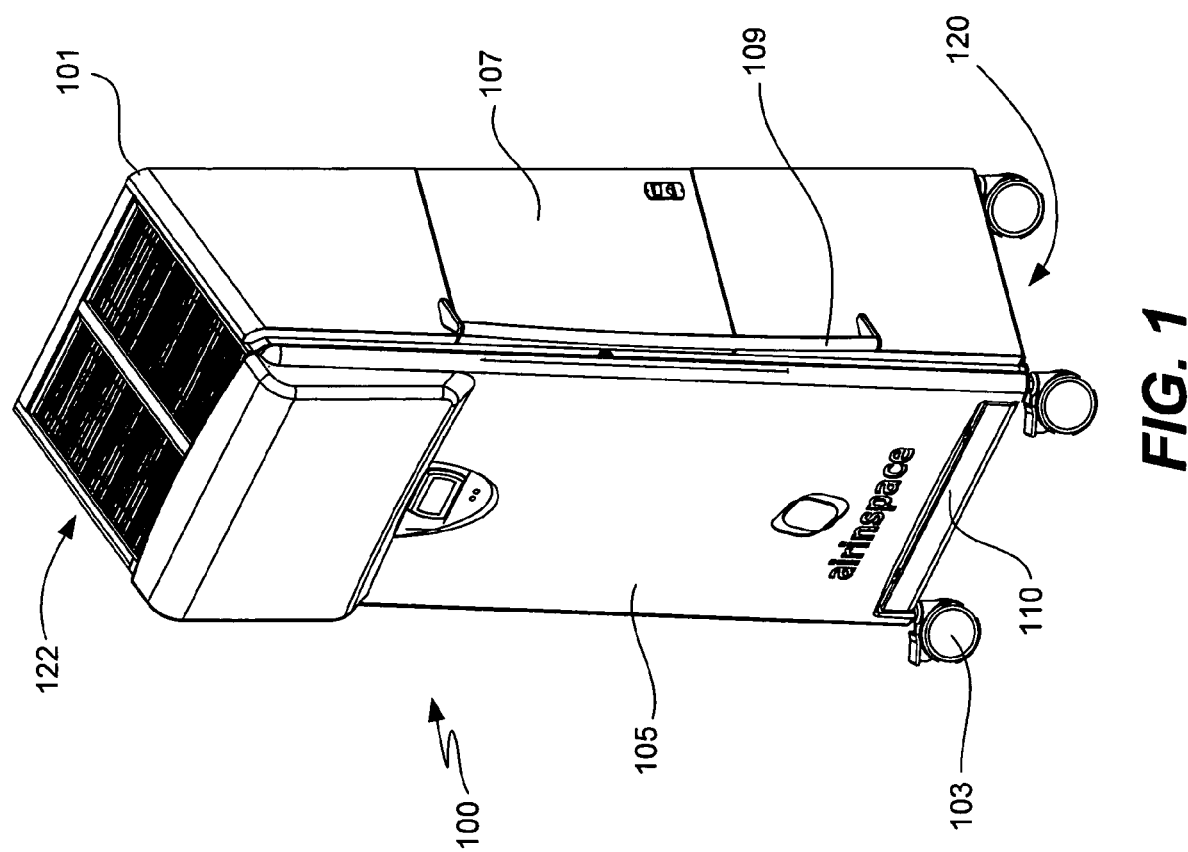
FIG. 1 is a diagrammatic perspective view of an air treatment system in accordance with one embodiment of the present invention.
Figure 2:
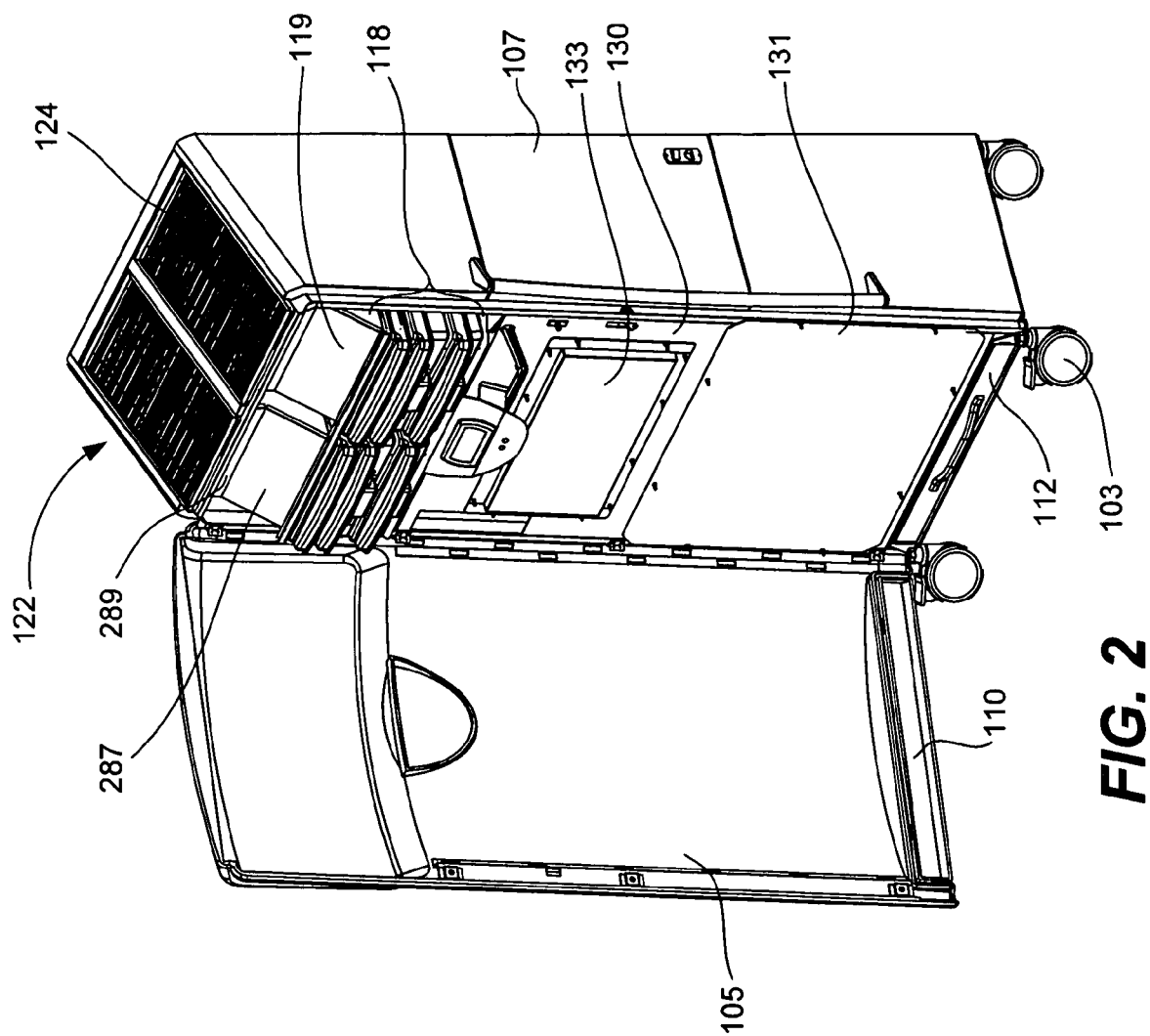
FIG. 2 is a diagrammatic perspective view of the air treatment system illustrated in FIG. 1 with the front door open.
Figure 3:
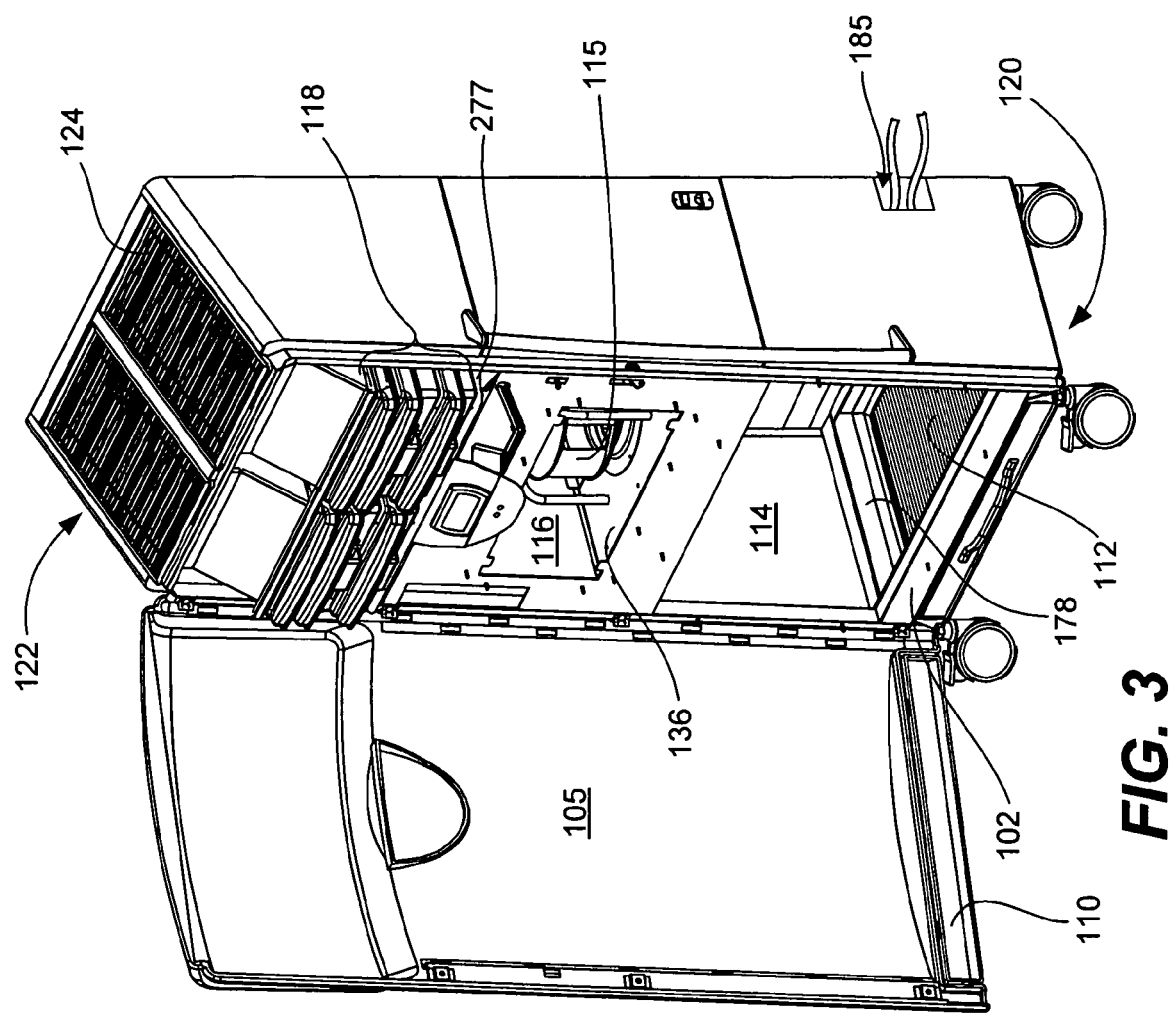
FIG. 3 is a diagrammatic perspective view of the air treatment system illustrated in FIGS. 2 with the cover plates removed to show the first and second chambers.

The present invention relates generally to transportable room air treatment systems, although some of the described components may be used in other air treatment systems as well. A transportable room air treatment system 100 in accordance with one embodiment of the present invention is illustrated in FIGS. 1-3. As seen therein, the air treatment system 100 has a cabinet or housing 101 that is mounted on rollers 103 so that the system may easily be transported and is generally portable. The cabinet 101 includes a frame 102 and has a front door 105 and a side compartment door 107. One or more grab bars 109 are provided on the sides of the cabinet 101 to facilitate transportation of the system. The front door 105 has a prefilter flap 110 that is pivotally mounted at a bottom end of the door. The prefilter flap 110 is arranged to provide ready access to a mechanical prefilter 112 located adjacent the system's air intake at the bottom end of the housing.

The bottom end of the cabinet 101 is generally open and acts as a large air intake 120. The incoming air is drawn upward through the cabinet and exits at an air outlet 122 located at the top end of the cabinet, which is also open. Within the cabinet, the incoming air first passes through the mechanical filter 112 and then through a first chamber 114 within the cabinet. As will be discussed in more detail below, an air conditioning unit 180 may optionally be positioned within the first housing chamber 114. A fan or blower unit 115 is positioned adjacent the first chamber and is arranged to draw air in the through inlet 120 and motivate the air to pass through the air treatment system to the outlet 122. After passing through the fan 115, the air stream passes through a second chamber 116 located around and above the fan. From the second chamber, the air stream passes into an air treatment unit 118, which in the illustrated embodiment takes the form of a pair of side-by-side plasma reactors. In other embodiments, other air treatment systems including ion enhanced electrostatic filters, UV based air treatment systems, mechanical HEPA or ULPA filters, etc. may be used in place of the plasma reactors. After exiting the plasma reactor, the air stream passes through ducts 119 to the air outlet 122. A pair of side-by-side adjustable louvers (diffusion grids) 124 are positioned in the air outlet to permit the outlet air stream to be directed in a desired direction.

Sealed internal ducting 130 is provided as necessary within the cabinet so that the airflow path within the cabinet is sealed even if the front door 105 and/or the side compartment door 107 are open. Thus, all of the air entering the system must flow through the reactor 118. This sealing helps reduce the probability that contaminated or unfiltered air will be drawn into the outlet air stream. A large first access opening is provided behind the front door to provide access to the first chamber 114. A first cover plate 131 covers the first access opening. The first cover plate 131 preferably has a seal and may be coupled to the housing frame 102 and/or the internal ducting 130. As will be described in more detail below, a cooling unit may be installed into the first chamber 114 through the first access opening.

A smaller second access opening is provided behind the front door to provide access to the second chamber 116. A second cover plate 133 covers the second access opening. The second cover plate 133 is coupled to the internal ducting 130 and may also include a seal. The second access chamber generally provides access for installation and maintenance of the fan unit 115.

A rigid support plate 136 is positioned in the airflow conduit between the first and second chambers 114, 116. The support plate 136 supports the fan unit 115 and has a central opening that permits air to pass through the fan unit. In order to properly treat a room using a portable air treatment system, it is important that the air treatment system 100 be capable of handling a relatively large volume of air. By way of example, airflow rates on the order of 500 to 2000 cubic meters per hour are desired in many applications. At these airflow rates, noise is a significant concern and the fan tends to be biggest noise generator.

Several measures are taken in the described embodiment to reduce the noise generated by the fan. Initially, the dimensions of the air conduit (flow channel) in the region of the first and second chambers 114, 116 are relatively large and the ratio of the hydraulic diameter of the second chamber to the diameter of the fan is relatively high, which helps reduce noise levels. By way of example, hydraulic diameter ($D_h$) to fan diameter ratio ($D_f$) (i.e., $D_h/D_f$) of at least 1.4 and more preferably at least 1.5 have been found to work well. As will be appreciated by those familiar with the art, the hydraulic diameter ($D_h$) of a generally rectangular cavity can be calculated as:

$$D_h = (2 \times \text{length} \times \text{width})/(\text{length}+\text{width})$$

It should be appreciated that the specific dimensions of the cabinet 101 and its various components and compartments can be varied significantly based on the needs of a particular application. In one particular embodiment, the inlet 120 to outlet 122 height of the cabinet is at least 1.5 meters, as for example, approximately 1.63 meters. In that embodiment, the dimensions of the fluid flow path in the first chamber are on the order of 480 by 847 mm, and the dimensions of the fluid flow path in the second chamber are generally on the order of 430 by 527 mm. Of course these dimensions can vary widely for different specific applications. The use of an air conduit with a large cross sectional area permits the use of a relatively large fan. The use of a generally larger fan permits the fan to be operated at a lower speed, which generally helps reduce the operational noise. By way of example, in a system having the aforementioned air conduit dimensions, a fan having a diameter of approximately 310 mm works well. One suitable fan is a model R3G 310-A139-71 fan available from EBM Papst. The fan is generally located in the center of the air conduit so that there is a reasonable gap between the fan and the housing/conduit walls. This provides a hydraulic diameter to fan diameter ratio of approximately 1.53, which further helps reduce noise.

The prefilter 112 also helps muffle noise outputted from the fan unit. Another advantage of using a conduit having a relatively large cross sectional area is that the prefilter 112 can have a large footprint, which helps reduce the pressure drop across the prefilter. Therefore, a high quality prefilter may be used. A wide variety of mechanical prefilters may be used for this purpose. By way of example, pleated F7-F9 filters have been found to work well for both filtering and noise reduction purposes.

Additionally, the second chamber is generally aerodynamically balanced from side to side and from front to back. This balancing helps reduce the probability that opposing sides of the fan experience significantly different pressures while the fan is operating, which tends to cause imbalances in the fan, which in turn tend to increase the noise generated by the fan.

Figure 7:
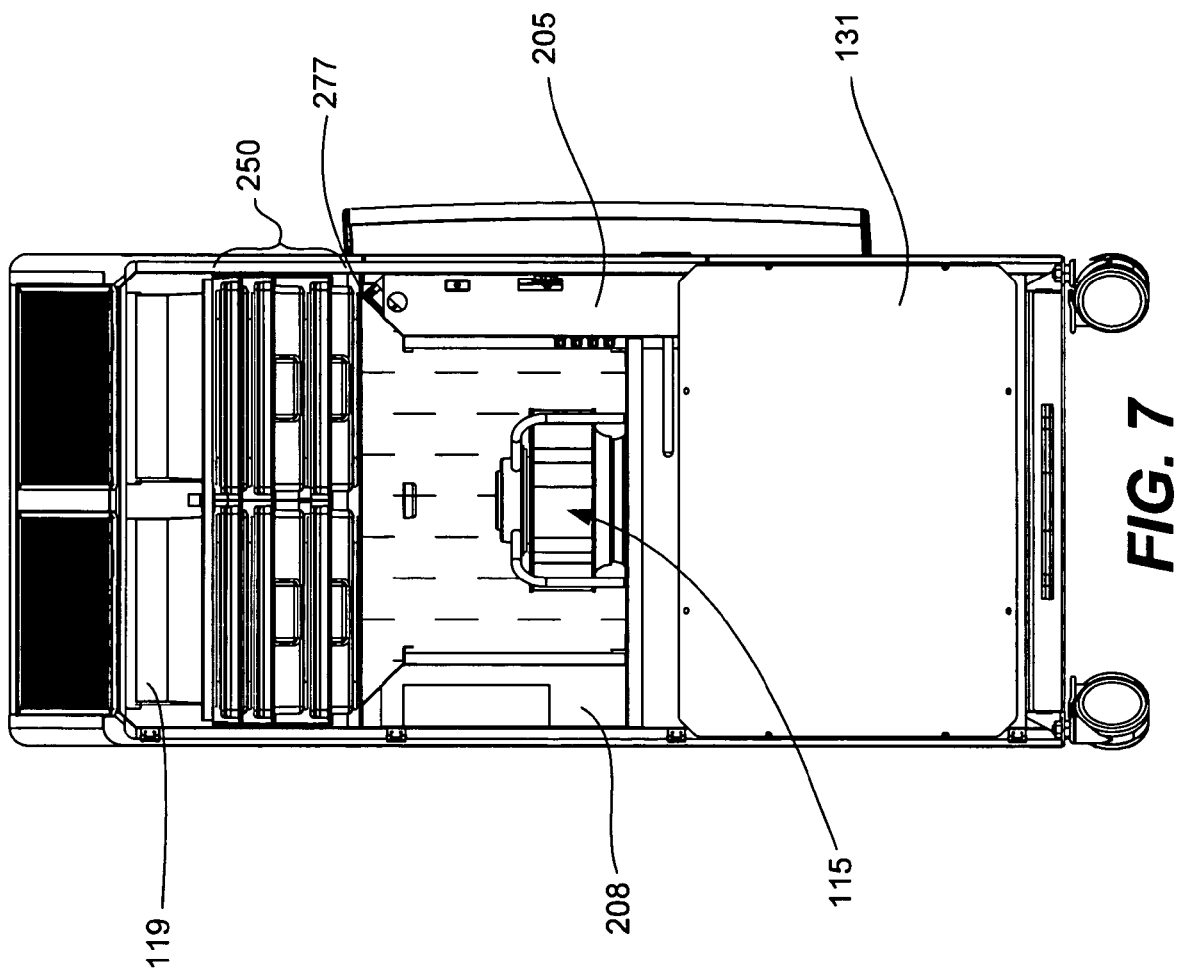
FIG. 7 is a diagrammatic front view of the air treatment system illustrated in FIG. 1 with the ducting and cover plate associated with the second chamber removed.

The side compartment door 107 encloses an electrical control box 205. The electrical control box 205 houses the powers supplies and control electronics for all of the electrical components in the air treatment system 100. For example, it includes power supplies and controllers for both the fan unit 115 and the cooling unit 180. It also includes the power supplies and control electronics for the plasma reactors 118. As best illustrated in FIG. 7, the electrical control box 205 extends inward from the housing so that the air conduit in the second chamber 116 is narrower than the air conduit in the first chamber 114. In some embodiments, the electrical control box 205 will also extend partially into the first chamber 114. A matching box 208 is provided on the opposite side of the second chamber than the electrical control box. The matching box 208 preferably has a face geometry that protrudes into the second chamber in a manner that matches the electrical control box 205. Thus, from the standpoint of the fan, the matching box 208 aerodynamically balances the electrical control box 205. In the illustrated embodiment, the matching box is essentially an empty space and its primary function is to provide aerodynamic balance for the fan. However, in alternative embodiments, portions of the electrical control box or other components may be positioned in the space defined by the matching box.

To further reduce noise, noise dampers may optionally be provided on the walls of one or both of the first and second chambers. The noise dampers may be made from any suitable material, as for example plastic materials. In some embodiments, the noise dampers may be coated with a bactericidal material to help prevent the growth of undesirable bacterial organisms on the surfaces of the noise dampers. For many applications, it is also desirable that the noise dampers be selected from materials that do not release volatile organic compounds (VOCs).

Figure 5B:
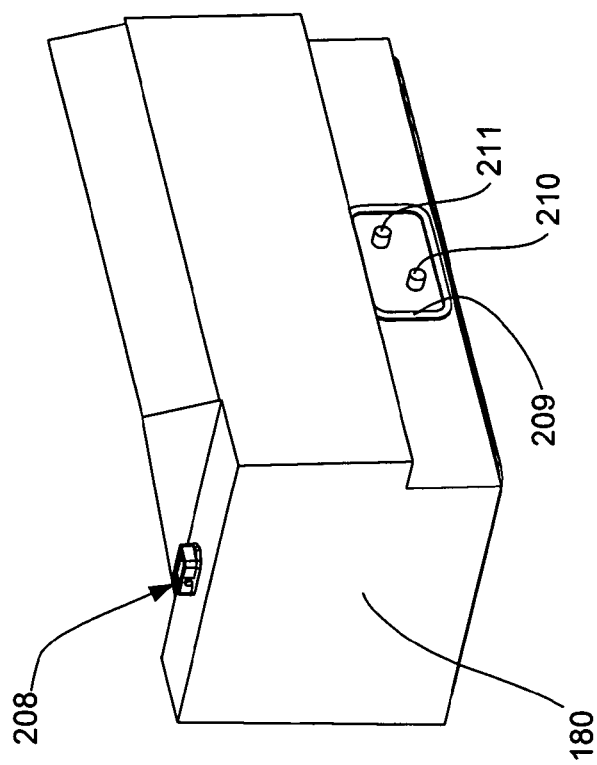
FIG. 5(b) is a diagrammatic back view of the cooling unit illustrated in FIG. 4(b).
Figure 5A:
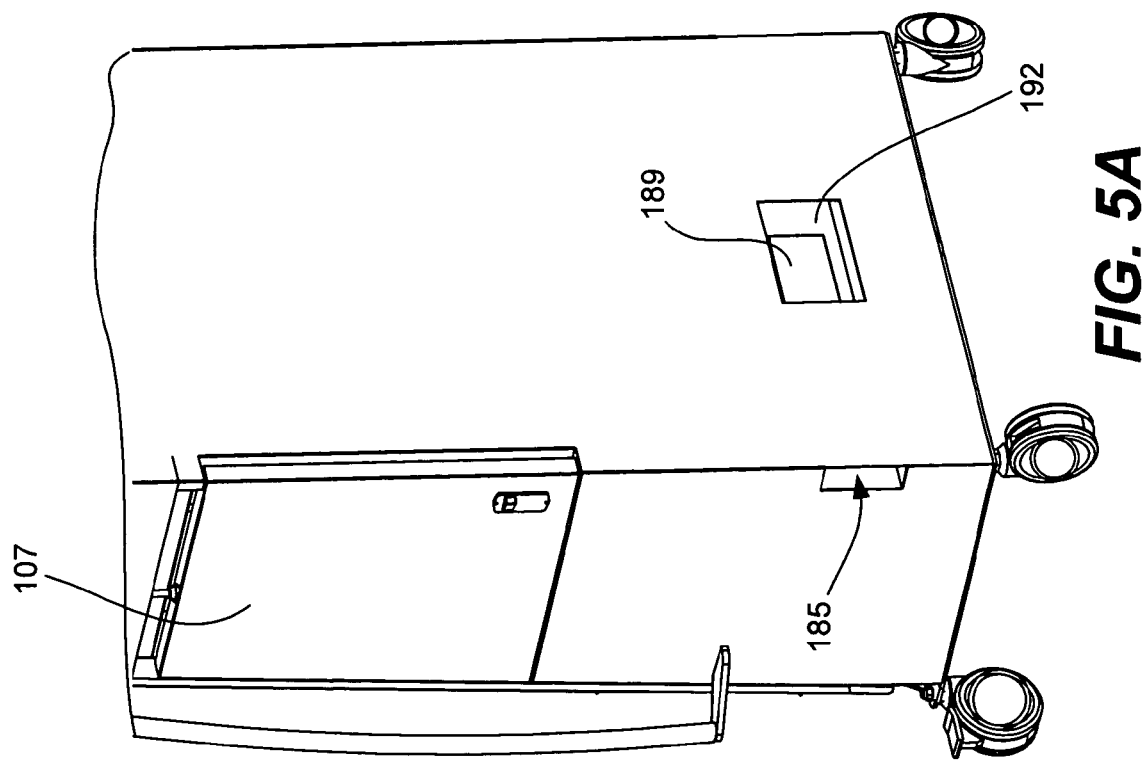
FIG. 5(a) is a diagrammatic view of the back of the housing without the cooling unit installed highlighting the cutouts for the cooling unit.

Referring next to FIGS. 4-6, the installation of a modular cooling unit 180 will be described in more detail. The modular cooling unit 180 is a freestanding unit that has a large central intake opening 184. The cooling unit may be placed in the first chamber 114 as a freestanding unit, with the cooling unit 180 resting on rails 178 coupled to the housing frame 102. In the illustrated embodiment, a seal 186 is provided on the bottom end of the cooling unit 180 in order to seal the connection with rails 178.

Since the cooling unit is quite heavy and it is sized to fit comfortably on the rails 178 of housing frame 102, there is no need to bolt or otherwise secure the cooling unit to the cabinet or housing frame. Its weight in combination with the housing frame 102 keeps the cooling unit in place. Since the cooling unit is quite heavy, it may be desirable to load and unload the cooling unit using lifting equipment such as a small manual floor jack. However, in alternative arrangements, the cooling unit can be installed by hand. It should also be noted that although there is no need to secure the cooling unit when installed for use, if the unit is to be transported it may be desirable to further secure the cooling unit for transportation.

The cooling unit 180 uses water as the heat sink and therefore it has water inlet and outlet ports 210, 211. The inlet and outlet ports 210, 211 have non-drip quick release connectors. A U-shaped conduit 185 is mounted on the back wall of the first chamber 114. An inlet hose 187 and an outlet hose 188 pass through the conduit 185 and are accessible inside the first chamber 114 through an opening 189 in the conduit 185. The inlet and outlet hoses 187, 188 terminate with non-drip quick release connectors that are designed to mate with the inlet and outlet water connectors 210, 211 on the cooling unit 180. Any of a wide variety of commercially available quick release, non-drip connectors can be used as the water connectors for the cooling unit and the inlet and outlet hoses.

The cooling unit 180 also preferably has an electrical connector 208 that may be engaged by an electrical cable 206 extends from electrical control box 205. The electrical cable 206 terminates with an electrical connector 207 which mates with the electrical connector 208 on the cooling unit. In the illustrated embodiment, the electrical cable 206 includes a power cord and a variety of electrical controller lines that are joined in one power/control cable. However, in alternative embodiments, multiple cords and/or cables may be used to electrically connect the cooling unit. By way of example, in some embodiments it may be desirable to separate the power cord from the control cable.

With the described arrangement, the installation and removal of the cooling unit 180 into the air treatment system 100 is very simple. With the unit turned off, the front door 105 of the cabinet is opened and the first cover plate 131 is removed. The cooling unit is positioned adjacent the front of the unit and the connector 207 on electrical cable 206 that extends from electrical control box 205 is coupled to the mating electrical connector 208 on the cooling unit 180.

Once the electrical cable(s) is connected, the cooling unit is lifted into place on the housing frame rails 178 and positioned so that a seal 209 on the back surface of the cooling unit presses against the conduit 185 thereby sealing the conduit opening 189. In this position, the opening 184 in the cooling unit is aligned with the opening 183 formed by the housing frame rails 178 so that the air flowing through the air treatment system passes through the cooling unit. With the cooling unit in place, water hoses 187, 188 are coupled to the cooling unit's water inlet and outlet ports. In the illustrated embodiment, a cutout 192 is formed in the housing directly behind the conduit opening 189 to provide access to the ends of the hoses 187, 188 and the cooling unit's inlet an outlet water connectors 210 and 211.

At this point, the cooling unit is installed and the cover plate 131 may be reconnected and the door closed. If desired, a cover plate may also be placed over the cutout 192 to close that opening. A reverse procedure may be used to remove the cooling unit from the air treatment system.

Although one particular method of installing the cooling unit is described, it should be appreciated that the cooling unit may take a wide variety of different forms than the illustrated embodiment and the cooling unit may be installed using different approaches as well. In some circumstances, variations in the installation method may be necessitated by the design of the cooling unit. For example, if some or all of the electrical power cord and/or control cables extend from the cooling unit, such cables would need to be plugged into appropriate receptacles and/or connectors located on an electrical control box. In other arrangements, the water hoses 187, 188 may be coupled to the cooling unit's water inlet and outlet ports before the cooling unit is placed into the first chamber. Generally, the hoses may move relatively freely through the conduit 185 and out the opening 189 so that they may be pulled through the first chamber 114 to be coupled to the cooling unit.

The size, location and shapes of the various components of the cooling system, including the openings 184, 189, 192, the conduit 185, the cooling unit 180, the cables, the ports, the housing frame, etc. support may all be widely varied from those illustrated in the drawings.

As will be appreciated by those familiar with air purification systems in general, refrigeration (e.g. cooling) units tend to accumulate condensation on at least their cooling heat exchangers. At times, such condensation can be conducive to the growth of various molds and bacteria, which of course is very undesirable in air purification devices. In the air treatment system 100, the cooling unit 180 is located downstream of the mechanical prefilter 112 to reduce the amount of dust and other materials that might accumulate on the heat transfer coils or other components of the cooling unit. At the same time, the cooling unit is located upstream of the air treatment unit 118 so that if any biological organisms that might be found on the cooling unit get entrained in the airflow stream, then they would be deactivated and filtered by the plasma reactors (or other appropriate structures) in the air treatment unit 118.

If the air treatment system 100 is used in an environment that is conducive to the growth of biological organisms on the cooling unit, it may be highly desirable to periodically clean the cooling unit. It should be apparent that the described cooling unit can be readily removed for cleaning and/or maintenance and easily reinstalled after such cleaning or maintenance. This provides a significant advantage over air treatment systems that require more extensive efforts to install and/or remove a cooling unit in terms of both (1) the time and effort required to clean and/or maintain the cooling unit; and (2) the accompanying disincentive to actually clean the unit on a regular basis.

It is noted that in some situations there may be residual amounts of solvent left on the cooling unit (or other components of the air treatment system) after cleaning. When air treatment system is used after the cooling unit has been reinstalled in the air treatment system, there is some chance that residual solvents may become entrained in the air stream as volatile organic compounds. This can be undesirable in environments where such smells are discouraged. A side benefit of using the plasma reactors 118 described above is that they will eliminate that vast majority of any volatile organic compounds passing there through, including residual solvents used to clean the cooling unit 180 or other components of the air treatment system.

It is also noted that in some environments, it may be preferable not to run all of the inlet air through an air conditioning system. In such applications some of the intake air may be arranged to pass through a cooling unit while another portion of the intake air may be arranged to bypass the cooling unit. Such partial cooling systems can easily be accommodated within the first chamber 114. Alternatively, if no cooling unit is necessary, a cover plate can simply be secured over the conduit opening 189 to seal the chamber 114.

Regardless of whether a cooling unit is provided, the air stream flowing through the air treatment system 100, will pass through the first and second chambers 114, 116 and into an air treatment unit 118. A wide variety of air treatment units may be used to treat the air. By way of example, plasma reactors, ion enhanced electrostatic filters, UV based air treatment systems, mechanical HEPA or ULPA filters, or a variety of other devices may be used to treat the air. Referring next to FIGS. 2 and 3 an air treatment unit that takes the form of a particular plasma reactor that is well suited for use in many applications will be described. The illustrated plasma reactor configuration is well suited for use in a variety of applications beyond the described transportable air treatment system as well.

In the illustrated embodiment, the air treatment unit takes the form of a pair of side-by-side plasma reactors 250. Each reactor 250 includes a stack of trays, with each tray housing one or more components of the reactor. The components of the plasma reactor may be varied to meet the needs of a particular application. By way of example, suitable reactor configurations are described in U.S. patent application Ser. Nos. 11/407,236 filed Apr. $18^{th}$, 2006 and 60/836,895, filed Aug. $9^{th}$, 2006, which are incorporated herein by reference.

Turning next to FIG. 8, the tray stacks will be described in more detail. In the illustrated embodiment, each plasma reactor 250 includes a stack of three trays. A first (upstream) tray 252 includes a plasma generator. A second (middle) tray 253 includes electrostatic filters and a third (downstream) tray 254 includes one or more catalysts. The nature and functions of these components are described in some detail in the referenced applications. Of course, in alternative embodiments, more or fewer trays could be provided as may be required and/or more or fewer components could be included in the plasma reactors.

Each of the trays 252-254 includes a box 260 and a lid 262 that covers the box. The depth of the box 260 may be varied depending on the thickness of the components housed therein. By way of example, it can be seen in FIG. 8 that in the illustrated embodiment, the box associated with downstream tray 254 is shallower than the box associated with the other trays. Of course, the depth of the boxes may be varied independently of one another.

The boxes 260 and the lids 262 each have side walls that are arranged in a generally rectangular configuration and the side walls of the lid are designed to fit relatively snugly over their associated boxes so that overlap between the lid and the side walls form a relatively airtight seal around the periphery of the trays. This helps prevents air from entering or exiting the reactor through any gaps between the lids and the boxes. The side walls may also optionally include a latch mechanism to help prevent the lid 262 from unintentionally separating from the box 260. In alternative embodiments, the internal surface of the lid and/or the external surface of the boxes may be fitted with a seal or sealing structure in order to provide a good peripheral seal. In still other embodiments, the side walls of a lid and its associated box may be glued (as for example using a thermoset glue), hot platen welded, thermosonically welded, ultrasonically welded or otherwise bonded, welded or fused together to form the peripheral seal.

Figure 8B:
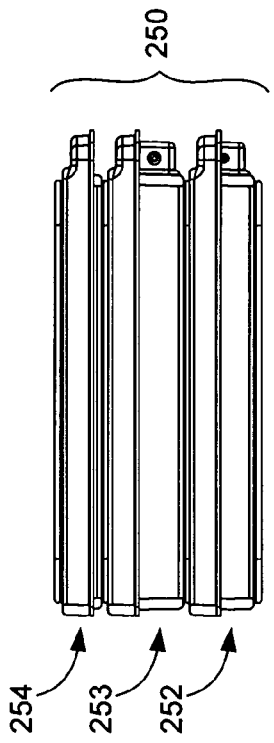
FIGS. 8(a)-(d) are front, side, top and exploded perspective views of a tray stack suitable of housing a plasma reactor or other air treatment unit.
Figure 8D:
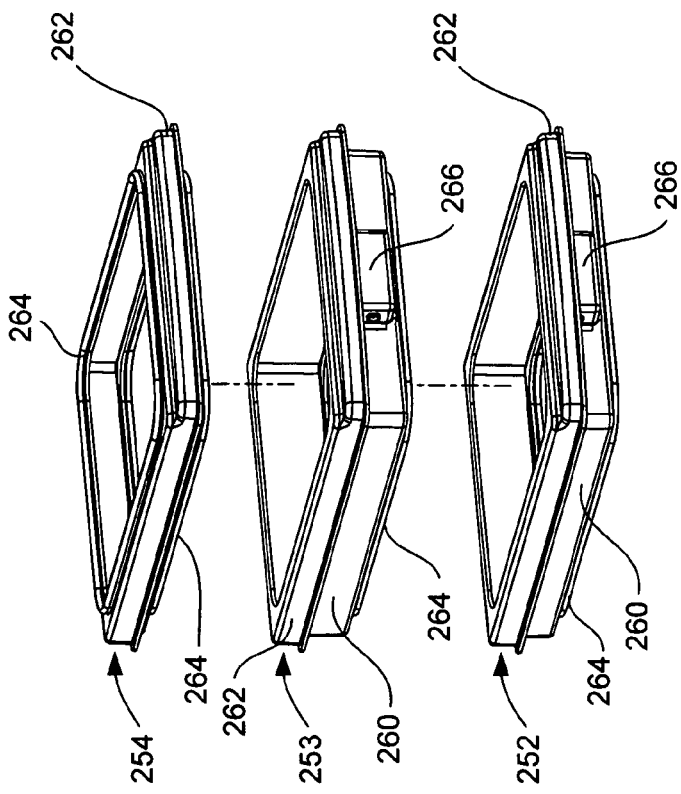
Figure 8A:
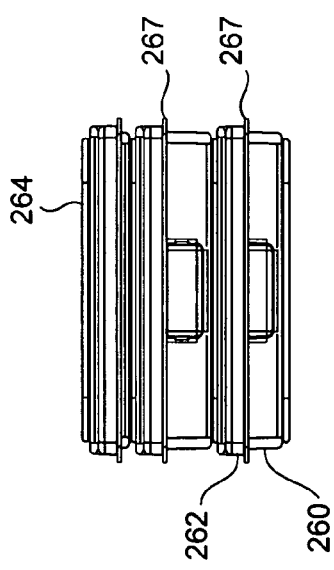
Figure 8C:
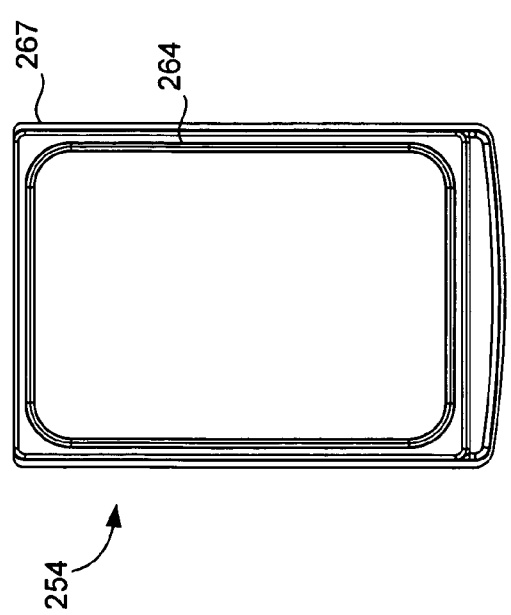

The box 260 has a bottom surface and the lid 262 has a top surface. The bottom surfaces of the boxes and the top surfaces of the lids each have a very large central opening. The central openings are preferably sized similarly and are aligned to form a central airflow path through the center of the reactor. Thus, the bottom surface of the box and the top surface of the lid are effectively simply peripheral rims as best seen in FIGS. 8(c) and 8(d). The lids also have peripheral external lips 267. The function of the lips 267 will be described in more detail below.

Some of the trays (e.g., the plasma generator tray 252 and electrostatic filter tray 253 in the illustrated embodiment) are powered electrically. Accordingly, those trays are additionally outfitted with an electrical connector box 266 that houses an electrical coupler suitable for electrically connecting the electrically driven components within the trays (e.g., the electrodes in the plasma generators and the electrodes in the electrostatic filters) with external power supplies and/or control cabling. In the illustrated embodiment, the power supply and any required control cabling come from the electrical control box 205.

The trays may be formed from plastic or other suitable materials and may be formed in any suitable manner such as injection molding. In the illustrated embodiment, the lids 262 all have the same sizes and dimensions. Such standardization is desirable to help reduce manufacturing costs, but is not required.

As described above, it is generally desirable to seal the trays to minimize air leaks into or out of the reactor. Similarly, it is desirable to provide seals between adjacent trays so that leaks between the trays are minimized. Accordingly, seals 264 are provided on the outer surfaces of the end trays and between adjacent trays.

In the illustrated embodiment, the side-by-side plasma reactors 250 rest on a shelf 277 that defines the upper boundary of the second chamber 116. The shelf 277 has large openings therein that generally match the lower openings in the upstream plasma reactor trays 252. Thus, the seal 264 on the bottom surfaces of the upstream trays 252 seal the interface between the plasma reactors 250 and the shelf 277.

Ducts 119 located downstream of the plasma reactors are arranged to fit over the top of the reactors stacks. Seals 264 on the top surface of the downstream trays 254 are arranged to seal the interface between the ducts and the reactors 250.

In order to maintain better seals between adjacent trays, it is desirable to place the tray stack under compression during use. The compression can be applied in a wide variety of manners. In the illustrated embodiment, the ducts 119 are carried on a duct frame 280. The duct frame may be moved up and down and is arranged to clamp the plasma reactor tray stacks into place. The clamping structure is generally illustrated in FIG. 10.

Figure 9:
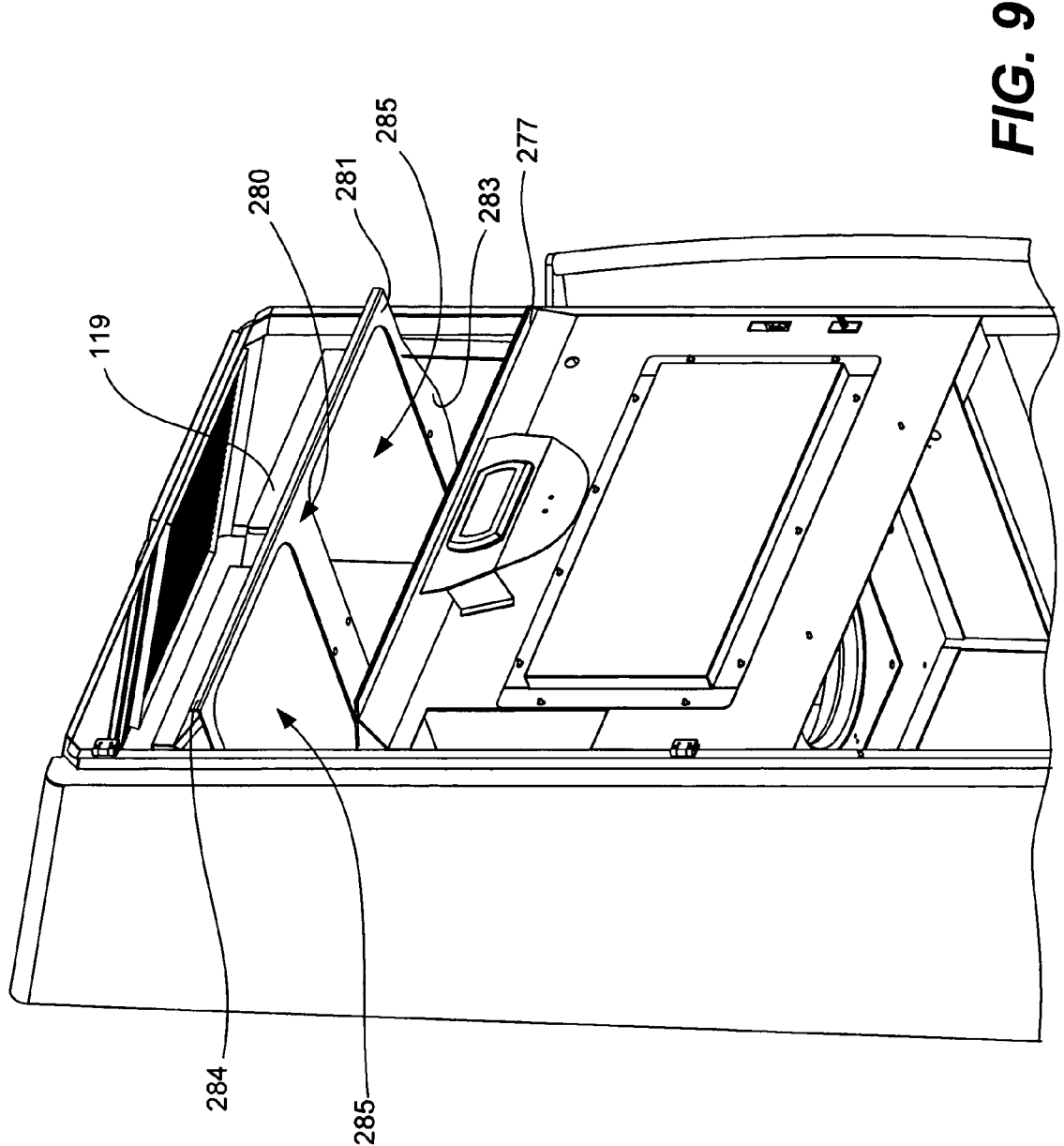
FIG. 9 is a more detailed front perspective view of the air treatment system shown in FIG. 3, highlighting the duct frame.

Referring next to FIG. 9, the duct frame 280 in the illustrated embodiment takes the form of a plate 281 having side edges 283 that are bend down and front and back edges 284 that are bent up. The bent ends help add structural rigidity to the duct frame 280. The duct frame has a pair of openings 285 that generally match the upper openings in the downstream plasma reactor trays 254. Thus, the seals 264 on the bottom surfaces of the upstream trays 252 seal the interface between the plasma reactors 250 and the duct frame plate 281. Ducting 119 extends upward from the openings 285 in duct frame 280 towards the air outlet 122 to channel the purified air towards the outlet. As seen, for example, in FIG. 2, the front and back sides of ducting 119 are initially tapered 287 inward to reduce the cross sectional area of the air flow path. A short untapered section 289 extends upward from the tapered section 287 towards the louvers 124. The untapered section 289 is received within ducting (not shown) that extends downward from the louvers 124.

As best seen in FIG. 10, a pair of independently actuatable clamp assemblies 290 are provided on opposite sides of the duct frame 280. Each clamp assembly 290 has a compression handle 292 that is pivotally coupled to a rod 293 though a linkage 295. The handle, linkage and rod are arranged so that the rod 293 may be lifted into a release position by pivoting the handle by 180 degrees and lowered into a compression position by pivoting the handle 180 degrees in the opposite direction. The free end of rod 293 is threaded and carries a bracket 296 which is coupled to the duct frame 280. The bracket may be coupled to the rod by any suitable arrangement, such as a threaded coupling. It may also be coupled to the duct frame by any suitable mechanism, as for example by welding. Therefore, raising the rod 293 lifts the duct frame 280 and lowering the rod 293 lowers the duct frame. The height of the bracket relative to the handle can be adjusted through the threaded engagement between the rod 293 and the bracket. A nut may be placed over the bracket to lock the bracket in place.

In the illustrated embodiment, a vertically oriented sheet 297 is coupled to the bracket and is arranged to extend along the side of the reactor tray stack 250. The vertical sheet 297 may be coupled to the bracket in any suitable manner as for example by appropriate bolts. In other embodiments, the sheet may be coupled to the rod 293. The sheet 297 has a plurality of spaced apart rails 298 that extend towards the tray stacks. Each rail is arranged to engage the lip 267 of an associated tray from below when the handle 292 is moved from the compression position to the raised position. In the illustrated embodiment, there are three trays and therefore three rails. If more or less trays were provided, then a corresponding number of rails would be provided.

Figure 10C:
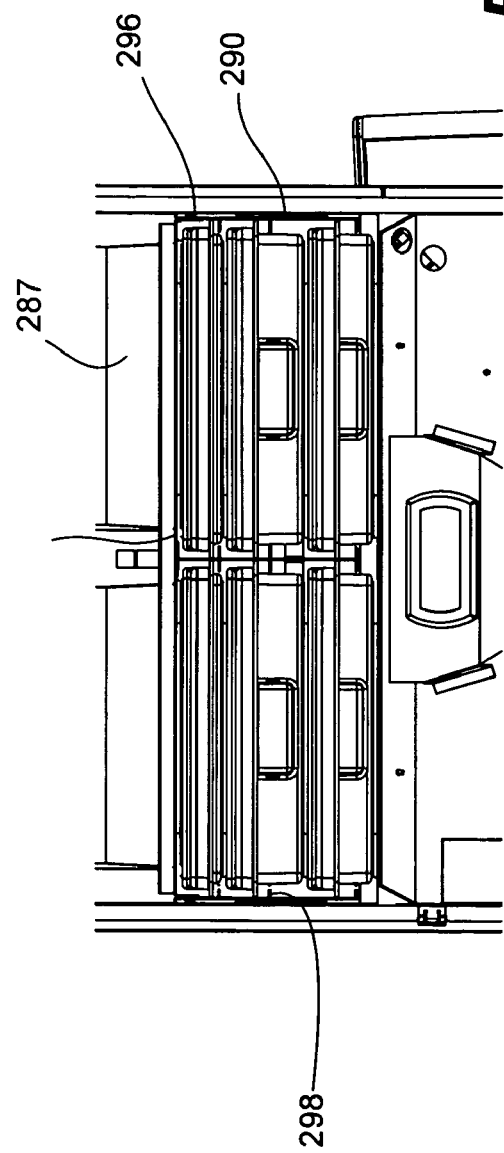
FIGS. 10(c) and 10(d) are side partially cutaway views of the duct based clamping system illustrated in FIGS. 10(a) and 10(b), with views of the clamping system in the compression and release positions respectively.
Figure 10D:
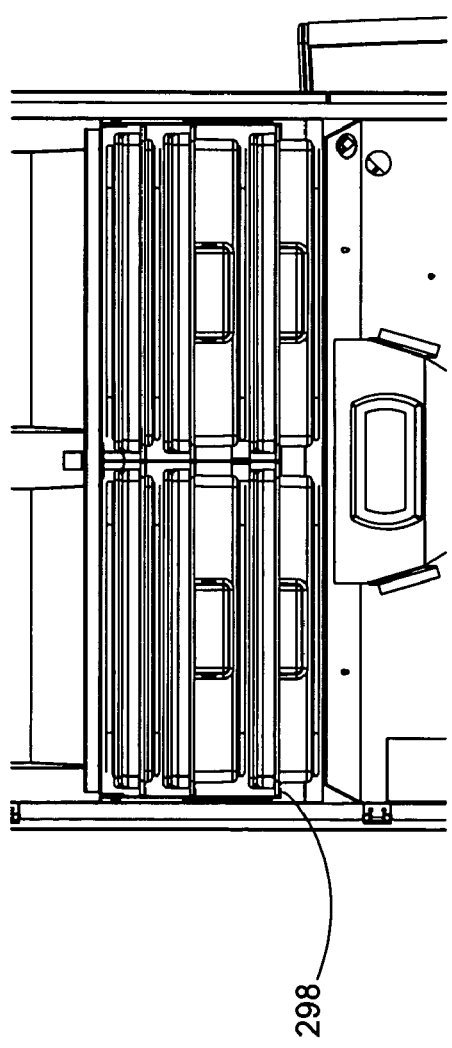

The rails 298 are arranged so that when the handle is in the compressed position, the rails are each positioned below the lip 267 of their associated tray as best illustrated in FIG. 10(c). The rails are staggered so that the uppermost rail is located closest to its associated rail in the compressed position and the lowermost rail is located furthest from its associated rail in the compressed position. As the handle 292 is rotated from the compression position, illustrated in FIG. 10(a), to the release position illustrated in FIG. 10(b), the rod will travel upward carrying the duct frame 280 and the vertical sheet 297 upward therewith due to the lifting of the bracket. As the vertical sheet is raised, the upper rail will soon engage its associated tray lip 267 thereby lifting the upper tray off of the tray below it. Shortly thereafter, the second rail will engage its associated lip and so on until each of the trays have been lifted before the handle reaches the raised position. In the release position best illustrated in FIG. 10(d), the trays are slightly separated and the rails then act as drawer rails so that the trays can be individually pulled from the tray stack. The staggering of the rails insures that the trays are separated as the duct frame 280 is lifted, thereby releasing the seals 264 between adjacent trays and providing sufficient room between the lifted trays to insure that the trays can be freely removed from the tray stack.

After a tray has been removed, any desired cleaning or maintenance may be performed, or the tray may simply be replaced. After all of the desired tray maintenance/replacement has been finished, the tray (or trays) may be placed back on the rails and the handled rotated back from the release position to the compression position. The force of the duct frame pressing against the tray stack brings the trays together causing the seals 264 to seal the boundaries between adjacent trays. In the illustrated embodiment, the handles 292 are located in and are accessible within the electrical control box 205 and the matching box 208 respectively. However, in alternative embodiments that compression handles can be position in any appropriate location.

Although only a few embodiments of the invention have been described in detail, it should be appreciated that the invention may be implemented in many other forms without departing from the spirit or scope of the invention. For example, the cooling unit 180 has been described primarily as an air conditioning unit. However, it should be appreciated that in alternative embodiments, other heating and air conditioning devices such as heat pump (which could either heat or cool the air passing through the system) or heated water heat exchange units may be provided in place of the described cooling unit.

In the illustrated embodiment, the electric control box 205 is provided in the second chamber 116 and a matching box 208 is provided in the same chamber in order to help aerodynamically balance the fan unit. It should be appreciated that in other embodiments, the electric control box could be located externally to the cabinet or at a wide variety of other locations within the cabinet. In still other embodiments, the electrical control and power supply components can be distributed in several locations within the cabinet.

A novel plasma reactor design formed from a compressed stack of trays has also been described. It should be apparent that the described compressed tray stack can be used in a wide variety of applications well beyond the free standing air treatment system described. Indeed the compressed tray stack arrangement can be used in a wide variety of other air treatment systems. Also, the described compressed tray stacks may be used to house a wide variety of air treatment components in place of or in addition to the described plasma reactors.

A duct based clamping system was used in the primary described embodiment. Such a clamping system works well for the described stacked tray based air treatment units. However, it should be apparent that a wide variety of other compression systems could be used in the alternative.

Therefore, the present embodiments should be considered illustrative and not restrictive and the invention is not to be limited to the details given herein, but may be modified within the scope and equivalents of the appended claims.

What is claimed is:

1. An air treatment system comprising:
   an air intake;
   a treated air outlet, there being an air flow path between the air intake and the air outlet;
   a fan arranged to convey air along the air flow path;
   an air treatment unit located downstream of the fan, the air treatment unit including a plurality of stacked trays; and
   a duct that directs air from the air treatment unit towards the treated air outlet, wherein the duct includes a duct frame member; and
   a clamp system including a linkage system that is coupled to the duct frame member and a handle that is pivotally connected to a linkage system and operable to move the duct frame member between compression and release positions through the linkage system, wherein in the compression position, the duct frame member and clamp system are operable to clamp the stacked trays together to help seal the stacked trays and when the handle is in the release position, the clamp system supports the trays in an affirmatively spaced apart manner.

2. An air treatment system as recited in claim 1 wherein the stacked trays include a first tray having a plasma generator therein and a second tray located downstream of the first tray that includes an electrostatic filter.

3. An air treatment system as recited in claim 2 wherein the stacked trays further include a third tray located downstream of the second tray that includes a catalyst.

4. An air treatment system as recited in claim 1 wherein the fan is capable of conveying at least approximately 1000 cubic meters per hour of air through the air treatment system along the air flow path.

5. An air treatment system as recited in claim 1 wherein the clamp system further includes a plurality of rail members, each rail member being arranged to engage an associated tray, wherein the rail members are positioned such that when the handle is in the release position, the rail members support their associated trays in a spaced apart manner.

6. An air treatment system as recited in claim 5 wherein:
   the linkage system includes a bracket that engages the duct frame, a rod that engages the bracket and a linkage mechanism that couples the handle to the rod;
   the clamp system further includes a sheet carried by the bracket; and the rails are carried on the sheet.

7. An air treatment unit for use in an air purification and filtering system, the air treatment unit comprising an ion generator arranged to ionize an airstream passing through the air treatment unit, an electrostatic filter located downstream of the ion generator, wherein the efficiency of the electrostatic filter is enhanced by ionization of the airstream and a catalyst located downstream of the electrostatic filter that is arranged to significantly reduce the concentration level of reactive species in the airstream before the airstream exits the air treatment unit, wherein the air treatment unit is housed in a plurality of immediately adjacent stacked trays, each tray being a self contained unit that houses at least one component of the air treatment unit therein, each tray being formed from molded plastic and including a box, a lid that covers the box, an upstream wall having an upstream opening, a downstream wall having a downstream opening, and substantially sealed side walls, wherein one of the upstream and downstream walls is part of the box and the other of the upstream and downstream walls is part of the lid, and wherein the upstream and downstream walls of each tray extend laterally inward from the tray's side walls such that the upstream and downstream walls extend at least partially over the component housed by the tray to effectively retain such component within the tray, the air treatment unit further comprising seals located between facing downstream and upstream walls of adjacent trays that are arranged to minimize leakage between adjacent trays, and wherein the stacked trays include:
   a first tray that houses the ion generator therein; and
   a second tray located downstream of the first tray that houses the electrostatic filter.

8. An air treatment unit as recited in claim 7 further comprising a third tray located downstream of the second tray that houses a catalyst.

9. An air treatment unit as recited in claim 8 wherein the ion generator is a plasma generator.

10. An air purification and filtering system comprising:
    a prefilter;
    an air treatment unit as recited in claim 7, the air treatment unit being located downstream of the prefilter; and
    a releasable clamping mechanism that clamps the trays together to help form peripheral seals between the trays, wherein the trays can be individually removed from the air purification unit when the clamping mechanism is released.

11. An air treatment unit as recited in claim 7 wherein the upstream and downstream tray openings are sized and configured substantially the same such that the downstream opening of each tray having an associated downstream tray matches the upstream opening of the associated downstream tray.

12. An air treatment unit as recited in claim 7 wherein each tray further includes a junction between the box and the lid is sealed to minimize peripheral leakage from the tray, and wherein each tray houses its associated components independently of the other trays.

13. A mobile air treatment system comprising:
a housing having a door;
an air intake located near a bottom end of the housing;
a treated air outlet located near a top end of the housing, there being an air flow path between the air intake and the air outlet;
a prefilter positioned within the air flow path and arranged to filter air drawn into the air flow path;
a first chamber located within the airflow path downstream of the air intake and the prefilter, the first chamber being accessible through the door; and
a fan arranged to convey air along the air flow path;
an air treatment unit located downstream of the first chamber and the prefilter;
a removable cooling unit positioned within the first chamber, the cooling unit being arranged to pre-cool at least some of the air that passes through the air treatment unit, wherein the removable cooling unit is positioned as a free standing unit within the first chamber; and
an electrical control system carried by the housing, the electrical control system being arranged to provide power and any required control to at least the fan and the removable cooling unit; and
wherein the removable cooling unit has a first electrical connector that may be coupled to the electrical control system, a water input coupling and a water outlet coupling, and whereby the cooling unit may be installed by placing the cooling unit as a freestanding unit in the first chamber through the door, and coupling the electrical with a second electrical connector associated with the electrical control box and coupling the water input coupling with an associated water supply and coupling the output couplings with an associated water drain.

14. A transportable air treatment system comprising:
a housing having a door;
an air intake located near a bottom end of the housing;
a treated air outlet located near a top end of the housing, there being an air flow path between the air intake and the air outlet and the distance between the air intake and the air outlet being at least 150 cm;
a prefilter positioned within the air flow path and arranged to filter air drawn into the air flow path;
a first chamber located downstream of the air intake, the first chamber having side walls and being sealed relative to the door;
a second chamber located downstream of the first chamber, the second chamber having side walls and being sealed relative to the door;
a fan support plate that defines a boundary between the first and second chamber;
a fan mounted on the fan support plate, the fan being arranged to convey air along the air flow path, wherein the fan is located substantially centrally relative to the side walls of the first chamber and the side walls of the second chamber, and a ratio of the hydraulic diameter of the second chamber to the diameter of the fan is at least 1.4;
an air treatment unit located downstream of the second chamber, the air treatment unit including a plurality of stacked trays and being arranged to further filter air conveyed along the air flow path; and
a clamp system including a linkage system and a handle that is pivotally connected to a linkage system and operable to move a frame member between compression and release positions through the linkage system, wherein in the compression position, the frame member and clamp system are operable to clamp the stacked trays together to help seal the stacked trays and when the handle is in the release position, the clamp system supports the trays in a spaced apart manner; and
wherein the second chamber is substantially balanced aerodynamically from side-to-side and from front-to-back as seen by the fan in order to help reduce the probability of air pressure imbalances on the fan that contribute to noise generation.

15. An air treatment system comprising:
a housing having a door;
an air intake located near a bottom end of the housing;
a treated air outlet located near a top end of the housing, there being an air flow path between the air intake and the air outlet and the distance between the air intake and the air outlet being at least 150cm;
a prefilter positioned within the air flow path and arranged to filter air drawn into the air flow path;
a first chamber located downstream of the air intake, the first chamber having side walls and being sealed relative to the door;
a second chamber located downstream of the first chamber, the second chamber having side walls and being sealed relative to the door;
a fan support plate that defines a boundary between the first and second chamber;
a fan mounted on the fan support plate, the fan being arranged to convey air along the air flow path, wherein the fan is located substantially centrally relative to the side walls of the first chamber and the side walls of the second chamber, and a ratio of the hydraulic diameter of the second chamber to the diameter of the fan is at least 1.4;
an air treatment unit located downstream of the second chamber, the air treatment unit being arranged to further filter air conveyed along the air flow path; and
a removable cooling unit positioned within the first chamber, the cooling unit being arranged to pre-cool at least some of the air that passes through the air treatment unit; and
wherein the second chamber is substantially balanced aerodynamically from side-to-side and from front-to-back as seen by the fan in order to help reduce the probability of air pressure imbalances on the fan that contribute to noise generation.

16. An air treatment system as recited in claim 14 further comprising a duct that directs air from the air treatment unit to the treated air outlet, wherein the duct includes the frame member that is operable to help clamp the stacked trays to help seal the stacked trays.

17. An air treatment system as recited in claim 14 wherein the fan is capable of conveying at least approximately 1000 cubic meters per hour of air through the air treatment system along the air flow path.

18. An air treatment system as recited in claim 14 wherein:
   a first one of the side walls of the first chamber has a first access opening that faces the door, the first chamber further comprising a first removable plate that covers the first access opening to seal the first chamber relative to the door; and
   a first one of the side walls of the second chamber has a second access opening that faces the door, the second chamber further comprising a second removable plate that covers the second access opening to seal the second chamber relative to the door.

19. An air treatment system as recited in claim 14 wherein:
   an electric control box positioned within the second chamber; and
   a matching structure positioned within the second chamber that substantially mirrors an external geometry of the electric control box to help aerodynamically balance the second chamber as seen by the fan.

20. An air treatment system as recited in claim 14 wherein the hydraulic diameter of the second chamber to the diameter of the fan is at least 1.5.

21. A mobile air treatment system as recited in claim 13 wherein the first chamber has side walls and is sealed relative to the door, wherein a first one of the side walls of the first chamber has an access opening that faces the door and the first chamber further includes a removable plate that covers the access opening to seal the first chamber relative to the door, and wherein the cooling unit is insertable as a unit through the door and access opening.

22. A mobile air treatment system as recited in claim 13 wherein the water inlet coupling and the water outlet couplings in the cooling unit are quick release couplings.

23. An air treatment unit for use in an air purification and filtering system, the air treatment unit comprising a plurality of immediately adjacent stacked trays, each tray being a self contained unit that houses at least one associated component of the air treatment unit therein and includes an upstream wall having an upstream opening, a downstream wall having a downstream opening, and substantially sealed side walls, wherein the upstream and downstream walls of each tray extend laterally inward from the tray's side walls such that the upstream and downstream walls extend at least partially over an associated component of the air treatment unit housed therein to effectively retain the associated component within the tray, and wherein the stacked trays include:
   a first tray having an ion generator component therein, the ion generator being arranged to ionize air passing through the first tray;
   a second tray located downstream of the first tray that includes an electrostatic filter component, whereby the efficiency of the electrostatic filter is enhanced by the ionization present in air entering the second tray from the first tray, and wherein air passing out of the second tray includes a concentration of reactive species; and
   a third tray located downstream of the second tray that includes a catalyst component arranged to significantly reduce the concentration level of reactive species in air passing through the third tray.

24. An air treatment unit as recited in claim 23 wherein:
   the ion generator is a plasma generator;
   the upstream and downstream tray openings are sized and configured substantially the same such that the downstream opening of each tray having an associated downstream tray matches the upstream opening of the associated downstream tray;
   each tray includes a box and a lid that covers the box; and
   a junction between the box and the lid is sealed to minimize peripheral leakage from the tray.

25. An air purification and filtering system comprising:
   a prefilter;
   an air treatment unit as recited in claim 24, the air treatment unit being located downstream of the prefilter; and
   a releasable clamping mechanism that clamps the trays together to help form peripheral seals between the trays, wherein the trays can be individually removed from the air purification unit when the clamping mechanism is released.

* * * * *